(12) United States Patent
Albrecht et al.

(10) Patent No.: US 8,552,070 B2
(45) Date of Patent: Oct. 8, 2013

(54) METALLIC PIGMENT PREPARATION IN COMPACTED FORM, METHOD FOR PRODUCING THE SAME AND USE THEREOF

(75) Inventors: Alexander Albrecht, Dormitz (DE); Kerstin Sperner, Bayreuth (DE)

(73) Assignee: Eckart GmbH (DE)

( * ) Notice: Subject to any disclaimer, the term of this patent is extended or adjusted under 35 U.S.C. 154(b) by 168 days.

(21) Appl. No.: 13/119,265

(22) PCT Filed: Aug. 18, 2009

(86) PCT No.: PCT/EP2009/005972
§ 371 (c)(1),
(2), (4) Date: Mar. 24, 2011

(87) PCT Pub. No.: WO2010/031476
PCT Pub. Date: Mar. 25, 2010

(65) Prior Publication Data
US 2011/0207833 A1   Aug. 25, 2011

(30) Foreign Application Priority Data

Sep. 16, 2008   (DE) .................. 10 2008 047 572

(51) Int. Cl.
*A61K 47/32* (2006.01)
(52) U.S. Cl.
USPC ....................................... 514/772.6; 524/559
(58) Field of Classification Search
USPC ....................................... 514/772.6; 524/559
See application file for complete search history.

(56) References Cited

U.S. PATENT DOCUMENTS

| | | | |
|---|---|---|---|
| 5,028,639 | A | 7/1991 | Treutlein et al. |
| 5,964,936 | A | 10/1999 | Reisser |
| 5,993,526 | A | 11/1999 | Sommer et al. |
| 6,398,862 | B1 | 6/2002 | Hechler et al. |
| 6,547,870 | B1 * | 4/2003 | Griessmann et al. ......... 106/417 |
| 6,589,331 | B2 | 7/2003 | Ostertag et al. |
| 6,638,353 | B1 | 10/2003 | Rathschlag et al. |
| 6,645,286 | B2 | 11/2003 | Ostertag et al. |
| 6,972,305 | B1 | 12/2005 | Griessmann et al. |
| 7,255,736 | B2 | 8/2007 | Pfaff et al. |
| 7,384,473 | B2 | 6/2008 | Reisacher et al. |
| 7,828,890 | B2 | 11/2010 | Henglein et al. |
| 2002/0023571 | A1 | 2/2002 | Rathschlag et al. |
| 2003/0066458 | A1 | 4/2003 | Emery et al. |
| 2007/0060668 | A1 | 3/2007 | Schoenefeld et al. |
| 2007/0199478 | A1 | 8/2007 | Schlegl et al. |
| 2008/0249209 | A1 | 10/2008 | Trummer et al. |
| 2010/0047199 | A1 | 2/2010 | Trummer et al. |

FOREIGN PATENT DOCUMENTS

| | | |
|---|---|---|
| DE | 19616287 A1 | 10/1997 |
| DE | 19947175 A1 | 4/2001 |
| DE | 10315775 A1 | 10/2004 |
| DE | 102004049203 A1 | 4/2006 |
| DE | 102007062942 | 6/2008 |
| EP | 0259592 B1 | 11/1990 |
| EP | 0616946 | 9/1994 |
| EP | 0583919 B1 | 11/1995 |
| EP | 1153995 A2 | 11/2001 |
| EP | 0848735 B1 | 1/2002 |
| EP | 0964895 A1 | 5/2004 |
| EP | 1517934 A1 | 3/2005 |
| EP | 1251153 B1 | 7/2005 |
| EP | 1251152 B1 | 9/2005 |
| EP | 1619222 A1 | 1/2006 |
| EP | 0962505 B1 | 3/2006 |
| EP | 1685198 B1 | 5/2007 |
| EP | 1812519 A2 | 8/2007 |
| WO | WO 85/00614 | 2/1985 |
| WO | WO 99/65995 | 12/1999 |
| WO | WO 02/22749 A1 | 3/2002 |
| WO | WO 2006/066825 A2 | 6/2006 |

OTHER PUBLICATIONS

International Search Report dated Mar. 25, 2010, issued in corresponding international application No. PCT/EP2009/005972.
Lehrbuch der lacktechnologie, 2. Auflage 2000, Vincentz Verlag Hannover (English translation of the 1998 edition is included herewith).
BASF AG, Leading Production Technology—Precondition for the Product Quality, Ludwigshafen, Germany, RCA 3210, 0686-2.0, fig. 1, (pp. 4 and 5 of the brouchure), pre-1993.
Merck product specification for 807490 Polyethylene glycol 4000, Apr. 8, 2013.
Merck product specification for 821037 Polyethylene glycol 2000, Apr. 8, 2013.
Evonik Industries brochure, "Flying the flag for customized solutions," Sep. 2011.

\* cited by examiner

*Primary Examiner* — Rei-tsang Shiao
(74) *Attorney, Agent, or Firm* — Ostrolenk Faber LLP

(57) ABSTRACT

A pigment preparation with metallic effect pigments in compacted form, the pigment preparation including the following components: a) 60%-95% by weight of at least one metallic effect pigment which has at least one low-refractive-index layer (low-index layer) on the metallic core of the metallic effect pigment, the low-index layer comprising or consisting of at least one inorganic component, b) 0.5%-40% by weight of a binder which is free from styrene groups, has an acid number of 150-500 mg KOH/g binder, and a melting point or melting range which lies in the range of 120-200° C., c) a residual moisture content in the range of 0%-15% by weight of at least one of water, organic solvent and a solvent mixture and d) optionally neutralizing agent(s). The disclosure further relates to a method for producing the pigment preparation and also to the use thereof.

14 Claims, No Drawings

METALLIC PIGMENT PREPARATION IN COMPACTED FORM, METHOD FOR PRODUCING THE SAME AND USE THEREOF

CROSS REFERENCE TO RELATED APPLICATIONS

The present application is a 35 U.S.C. §371 National Phase conversion of PCT/EP2009/005972, filed Aug. 18, 2009, which claims benefit of German Application No. 10 2008 047 572.6, filed Sep. 16, 2008, the disclosure of which is incorporated herein by reference. The PCT International Application was published in the German language.

TECHNICAL FIELD

The invention relates to a pigment preparation with metallic effect pigments in compacted form, to a method for producing this pigment preparation, and to the use thereof.

BACKGROUND

For the production of liquid varnishes, paints, coating materials, emulsion paints, and printing inks containing metallic effect pigment, or for the coloring of plastics, platelet-shaped metallic effect pigments, usually in the form of dry powders or in the form of pastes, are incorporated into the formulation in question. These metallic effect pigment pastes usually comprise organic solvent and/or water as a pasting medium. With these two presentation forms of the metallic effect pigment, however, the process step of pigment incorporation has decisive disadvantages. Metallic effect pigment powders generate a considerable dust load at the production venue, resulting in increased workplace safety requirements. Metallic effect pigment pastes exhibit disadvantages in metering and, in the case of organic solvents as the pasting medium, generate a considerable odor nuisance at the production venue, and contribute to an increased VOC load in the environment. With both presentation forms, furthermore, there are disadvantages in transportation, owing to the considerable risk potential of a dust explosion and to the combustibility of organic solvent, respectively.

Even during relatively short storage times of several weeks to a few months, and particularly in the fine particle-size range, i.e., with metallic effect pigments having a relatively low pigment diameter, conventional metallic effect pigment pastes display a tendency toward aggregation, in other words toward the formation of intergrown primary particles which are positioned flatly against one another, which cannot be reversed in the course of incorporation into the end product in question. A short guaranteeable shelflife is the consequence. Moreover, homogeneous distribution of a metallic effect pigment powder in the application medium in question is often difficult, if not impossible, to achieve. In varnishes or plastics, for example, agglomerates of the pigment powder occur that cannot be deagglomerated under standard processing conditions.

In the case of processing in aqueous application media, it is always necessary to suspend metallic effect pigment powders or metallic effect pigment pastes in suitable cosolvents in order to ensure optimum pigment dispersion. Only the incorporation of this suspension into the aqueous coating formulation ensures homogeneous distribution of the pigments in the coating formulation and hence the development of the desired shade or metallic effect.

Conversely, and especially as part of the efforts to reduce the VOC loads (VOC: volatile organic compound), there is an urgent need to make further significant reductions in the fraction of organic solvents, even in waterborne coating materials.

There is therefore a demand for largely solvent-free presentation forms of metallic effect pigments for waterborne coating materials.

Many of the disadvantages identified can be circumvented or alleviated by means of a usually dry pigment preparation.

EP 1 517 934 A1 describes pigment preparations which in addition to pigment contain particular surface-active substances, which, however, are anionic or nonionic in nature or consist of mixtures of both. These preparations feature ready dispersibility in a wide variety of application media. Disadvantageously, however, it is not possible to provide dimensionally stable, compacted presentation forms of these pigment preparations. A further disadvantage of these pigment preparations lies in the high level of anionic and also, where used, nonionic additives, which may have an unwanted influence on the varnish or paint system into which the pigment preparation is incorporated.

Furthermore, with regard to the method for producing the pigment preparation, wet comminution in aqueous suspension is described. In the case of the use of platelet-shaped metal pigments, the mechanical comminution that occurs subjects the primary particle size of the pigment ready-produced per se—for example, the metal flake substrates provided with the desired coatings—to such severe alteration that the parameters or properties desired for the application, such as corrosion stability and optical quality, for example, are no longer fulfilled. For example, the wet comminution destroys any pigment coatings, and the reaction that occurs between metal pigment and water produces a sustained and adverse alteration in the character, more particularly the optical properties, of the metallic effect pigment. In none of the possible applications of such metallic effect pigment products is it possible any longer to achieve the desired metallic effect which would have been achievable if the uncomminuted starting metallic effect pigment powders or pastes had been used. The chemical stability of such preparations, containing coated metallic effect pigments, is no longer a given in aqueous applications, as a result of the destroyed coating.

EP 0 964 895 A1 refers to metallic effect pigment preparations which first and foremost are pastelike but which may also be processed further to form dry products. These pigment preparations comprise organic polymers in general form. The pigment content of the pigment preparation described in EP 0 964 895 A1, at only 40%-60% by weight, is—disadvantageously—relatively low, and this entails disadvantages for the user of the pigment product. As a result of such a low level of pigment in the product, the user has to accept a high fraction of extraneous substances in his or her formulation, and these substances may adversely influence the desired properties of his or her coating formulation.

DE 199 47 175 A1 describes a preparation with effect pigments which comprises as its resin component a styrene-modified maleate resin. The parent structure of the resin in this case is composed of maleic anhydride and styrene. Of styrene-containing binders, however, it is known that the weather stability of a coating deteriorates as the styrene content increases.

Furthermore, dry metal pigment products described in DE 199 47 175 A1 exhibit deficient pellet strength and disintegrate in service, with considerable dusting.

EP 1 104 447 A1 describes pigment preparations with polyalkylene glycols and also hydroxyl-rich binders. In the case of the dry products described, based more particularly on pearlescent pigments, the polyalkylene glycols, as for example polyethylene glycol 2000, do result in an improvement in strength, but impair the shelflife of the dry product such that, particularly when metallic effect pigments are used, there is formation after just a short time of pigment aggregates which can no longer be redispersed in the varnish. The loss of opacity through aggregation is high, and thus the shelflife is unsatisfactory. Furthermore, in paints and varnishes, polyethylene glycol has the disadvantageous effect of low weathering stability.

The dispersibility of these dry products in coating materials is difficult and requires high shearing forces and is therefore complicated and costly from the standpoint of process engineering. A disadvantage is that, with the high shearing forces that are necessary, there may be instances of damage to the pigments, more particularly to the pigment surface. Furthermore, applications of these polyalkylene glycol-containing products in coating materials are less brilliant than of coatings produced using corresponding powders or pastes which are free from polyalkylene glycol.

European patent EP 1 153 995 discloses a pigment preparation with effect pigments which as its resin component has a modified rosin with particular properties in terms of acid number, hydroxyl group content, and softening point. In the case of metallic effect pigments, however, these preparations do not exhibit high dimensional stability. The dispersing and opacity, i.e., hiding of a substrate per unit weight of pigment, in waterborne coating materials is likewise unsatisfactory. The softening range of the resins used, furthermore, of 50-120° C., is a disadvantage in relation to the operation of producing compacted pigment preparations. In this low temperature range, in the course of the drying of the pigment product, there is a risk of softening and blocking of the resin. Accordingly, the compacted pigment preparation is no longer free-flowing. Additionally, metallic effect pigments which have "sintered together" with softening of the resin are difficult to disperse, or cannot be dispersed at all, in a varnish system.

Particularly in the case of metal pigments, and especially for aqueous applications, the specifications cited in the prior art do not result in satisfactory solutions.

WO 85/00614 describes the production of pellets with metal pigments. Disadvantageously, however, no useful applications are disclosed therein for aqueous systems.

DE 196 16 287 A1 describes the production of pearlescent pigment preparations for printing inks. Here too, however, there are no possible solutions for aqueous coatings with metallic effect pigments.

SUMMARY

The object on which the invention is based is that of providing a metallic effect pigment preparation which can be formulated in a compacted presentation form and hence allows low-dust, preferably dust-free, meterability in combination with preferably minimal VOC loading. The metallic effect pigments in this preparation are, it is further intended, to be distinguished by very high opacity in an application medium. The preparation is also to have improved dimensional stability and a long shelflife, and over the storage time is not to result in any more than a very slight change in the pigment properties, and more particularly is not to result in any formation of pigment aggregates. The metallic effect pigment preparation is to be readily dispersible not only in aqueous but also in solvent-containing application systems, the metallic effect pigments having a high opacity in the application medium and the optical properties of the metal pigments being unaffected on incorporation into the application medium.

A further intention is to find a cost-effective method for producing the metallic effect pigment preparation of the invention.

This object is achieved by provision of a pigment preparation with metallic effect pigments in compacted form, the pigment preparation comprising the following components:
a) 60%-95% by weight of at least one metallic effect pigment which has at least one low-refractive-index layer (low-index layer) on the metallic core of the metallic effect pigment, the low-index layer comprising or consisting of at least one inorganic component,
b) 0.5%-40% by weight of a binder which is free from styrene groups, has an acid number of 150-500 mg KOH/g binder, and a melting point or melting range which lies in the range of 120-200° C.,
c) a residual moisture content in the range of 0%-15% by weight of water and/or organic solvent and/or solvent mixture
d) optionally neutralizing agent(s).

The figures in % by weight are based in each case on the total weight of the pigment preparation and add up in each case to 100% by weight.

Preferred developments of the invention are specified in certain dependent claims.

The object on which the invention is based is further achieved through provision of a method for producing the pigment preparation of the invention, comprising the following steps:
a) mixing a metallic effect pigment which has at least one low-refractive-index layer (low-index layer) on the metallic core of the metallic effect pigment, the low-index layer comprising or consisting of at least one inorganic component, with at least one binder which has an acid number of 150-500 mg KOH/g binder, and a melting point or melting range which lies in the range of 120-200° C.,
b) compacting the mixture obtained in step a),
c) optionally drying.

A preferred development of the method is specified in at least one other dependent claim(s).

DETAILED DESCRIPTION

It has surprisingly emerged that compacted metallic effect pigment preparations can be provided which have a high metallic effect pigment content, are dimensionally stable in the respective compacting form, and, following introduction into an application medium, disintegrate readily with separation of the metallic effect pigments. Very surprising in this context is the fact that, on the one hand, the dimensional stability of the compacted presentation form comprising metallic effect pigment, which requires increased attachment of the metallic effect pigments to one another in the respective compacted presentation form, and on the other hand a ready disintegration of the compacted presentation form comprising metallic effect pigment into individual, i.e., unaggregated, metallic effect pigments, can be combined with one another following incorporation into an application medium.

The metal effect pigment preparation of the invention, which may be present, for example, in the form of granules, pellets, briquettes, chips, tablets, sausages, etc., is extremely easy to handle. With this compacted presentation form, there is no risk of a health hazard posed by dust, as for example by the inhalation of dust particles, or in the form of a dust explosion. Nor is there any risk of inhalation or inflammation of volatile organic solvents.

It has emerged, moreover, that in the compacted form the metallic effect pigments are protected more effectively from mechanical exposure, as for example in the course of transportation or transfer, than in the case of a metallic effect pigment powder, where rubbing of the metallic effect pigments against one another or against the walls of vessels or pipes may result in damage to edges and surfaces of the metallic effect pigments. Instances of such damage may lead to these metallic effect pigments being affected by corrosion at a later point in time, and hence in graying in a paint or varnish film, which is extremely undesirable.

For humans and the environment, therefore, the compacted presentation form constitutes a significant advance.

The terms "metallic effect pigment" and "metal pigment" are used interchangeably in the present text and denote platelet-shaped metal pigments. These platelet-shaped metal pigments have a platelet-shaped metallic core or metal core which may be provided with one or more coatings, preferably enveloping coatings.

By a metallic effect pigment is meant a platelet-shaped metal pigment. The average diameter of a platelet-shaped metal pigment (metallic effect pigment) is typically 1 to 200 µm, preferably 3 to 100 µm, more preferably 5 to 80 µm. The thickness of the metallic effect pigments (without additional coating) in this case is typically in a range from 20 nm to 2 µm, the ratio of diameter to thickness being typically in a range from 2000:1 to 10:1, preferably of 1500:1 to 50:1, more preferably of 1000:1 to 100:1, more preferably still of 500:1 to 200:1. This ratio is also referred to as form factor.

A "low-index layer" in the sense of the invention means a layer or coating of substances having a low refractive index. A low refractive index in the sense of the invention is preferably a refractive index of less than 2.2, preferably less than 2.0, more preferably less than 1.8, preferably less than 1.7. In one preferred embodiment of the invention the low refractive index is in a range from 1.4 to 1.65, preferably from 1.45 to 1.6.

A low-index layer is preferably a layer or coating comprising and preferably composed of one or more metal oxides and/or metal oxide hydrates having the stated low refractive indices. Preference is given to using silicon oxide, preferably $SiO_2$, and/or aluminum oxide, preferably $Al_2O_3$, and/or the hydrates thereof.

The pigment preparation of the invention is a low-dust, preferably dust-free, free-flowing product which can be processed with numerous commercially available binder systems, based both on water and on organic solvents, to form highly opaque, metallic-effect-pigmented paints, varnishes and printing inks for a wide variety of applications. The pigment preparation may be dispersed directly, without suspension beforehand, into the application medium: varnish, paint or printing ink, for example. Very advantageously, the compacted presentation form disintegrates, and releases the metallic effect pigments in so doing. The metallic effect pigments following incorporation, therefore, are present substantially in an unagglomerated form, preferably in an unagglomerated form, in the application medium.

The pigment preparation of the invention comprises metallic effect pigments.

Metallic effect pigments used are platelet-shaped metal pigments based preferably on aluminum, zinc, magnesium, iron, stainless steel, copper, brass, silver or gold.

Particularly preferred in this context are aluminum, brass and/or iron effect pigments, and with very particular preference aluminum effect pigments.

The metallic effect pigments may be of the cornflake type or silver dollar type, which are metallic effect pigments obtained by deformative grinding. In a deformative grinding operation, metal particles, preferably spherical metal particles, are ground in the presence of grinding media, preferably spherical grinding media, such as, for example, steel balls or ceramic balls, in a ball mill, for example, preferably in the presence of lubricants such as stearic acid or oleic acid, and hence are formed into platelets. They encompass sizes which are characterized preferably by a $d_{50}$ from a range from 2 to 100 µm, preferably from 5 to 50 µm, and more preferably from 7 to 35 µm. This $d_{50}$ is the value of the volume-averaged cumulative frequency distribution of the size distribution as determined by means of laser diffraction methods. The $d_{50}$ here indicates that 50% of the particles have or are smaller than the stated diameter, 100 µm, for example. The cumulative frequency distribution is also termed cumulative undersize distribution.

The average thickness of the metallic effect pigments without coating is 50 to about 2000 nm, preferably 60 to 1000 nm, and more preferably 200 to 600 nm.

In the case of aluminum effect pigments, preference extends further to new embodiments of very thin pigments, which are produced by grinding, more particularly by wet grinding, as are described in DE 103 15 775 A1 or DE 10 2007 062942, the content of which is hereby incorporated by reference. These are preferably aluminum effect pigments having an average thickness from a range from 20 to 100 nm and preferably from 40 to 80 nm.

In the case of iron effect pigments, preference is given particularly to those produced from carbonyl iron powder. The production of these iron effect pigments is described in EP 1 251 152 B1 and EP 1 251 153 B1, the content of which is hereby incorporated by reference. The carbonyl iron powder is prepared preferably by decomposition of iron pentacarbonyl $Fe(CO)_5$ in vapor form in cavity decomposers (cf. brochure from BASF AG, Ludwigshafen, Germany, RCA 3210, 0686-2.0, FIG. 1) and may be acquired from BASF AG, for example. The carbonyl iron powder contains up to 1.5% by weight of carbon, about 1% by weight of oxygen, and up to 1% by weight of nitrogen, the figures in % by weight being based on the overall weight of the carbonyl iron powder. The carbonyl iron powder is preferably subjected to reductive treatment in a stream of hydrogen, producing reduced carbonyl iron powder which has an iron content of more than 99.5% by weight and can be subjected to deformative grinding. The reduced carbonyl iron powder used preferably has an average particle size in a range from 0.5 to 15 µm, preferably from 1 to 10 µm.

For producing liquid, metallic-effect-pigmented varnishes and paints comprising water, it is normally necessary, on account of the chemical interaction of water and metal pigment, to use metallic effect pigments that have been passivated—that is, stabilized to corrosion. The use of uncoated metallic effect pigments, such as aluminum flakes, for example, of the kind used in solventborne varnishes and paints, would result in chemical attack on the pigment surface and hence in adverse alteration of the desired metallic effect. The formation of hydrogen gas in the course of such chemical attack, furthermore, leads to considerable dangers.

In light of the disadvantages of the processing of metallic effect pigment pastes and metallic effect pigment powders, and of the need for passivated metallic effect pigments, particularly for aqueous coatings applications and coating systems, the pigment preparation of the invention comprises 60%-95% by weight of at least one metallic effect pigment which has at least one low-index layer comprising or consisting of at least one inorganic component.

The low-index layer preferably has a refractive index <2.2 and preferably <2.0.

The inorganic component of the low-index layer is preferably metal oxide, metal hydroxide, metal oxide hydrate, metal sulfide, metal selenide, metal nitride, metal phosphate or combinations or mixtures thereof.

In one embodiment of the invention it is preferred that the at least one low-index inorganic component of the low-index layer is a metal oxide, metal hydroxide and/or metal oxide hydrate layer.

It is further preferred that the layer is composed of a low-index metal oxide, metal hydroxide and/or metal oxide hydrate.

In another preferred embodiment of the invention, the low-index layer consists of or comprises inorganic/organic, i.e., hybrid, mixed layers. Metallic effect pigments coated with inorganic/organic hybrid layers of this kind are disclosed in EP 1812519 A2, hereby incorporated by reference.

In a further-preferred embodiment, the inorganic component of the low-index layer, or the low-index layer itself, is an inorganic metal oxide, metal hydroxide and/or metal oxide hydrate layer which is selected preferably from the group of oxides, hydroxides or oxide hydrates of the elements silicon, aluminum, chromium, chromium-metal alloys, vanadium, molybdenum, and mixtures thereof and combinations thereof.

In a further-preferred embodiment, the inorganic metal oxide, metal hydroxide and/or metal oxide hydrate layer is selected from the group consisting of oxides, hydroxides or oxide hydrates of the elements silicon, aluminum, chromium, chromium-metal alloys, molybdenum, and mixtures and combinations thereof and has a layer thickness of 5 to 90 nm.

Especially preferred in this context are the metal pigments coated with silicon oxides and/or silicon oxide hydrates or with chromium-metal mixed oxide layers or chromium oxides obtained by chromating procedures. In the case of the chromium-metal mixed oxides, the metal is preferably the metal of the metal flake to be coated, such as aluminum, iron or stainless steel, for example. Metallic effect pigments coated in this way have proven to be the most stable metal pigments for aqueous applications.

The pigment preparations of the invention may also be used, furthermore, in solvent-based varnishes, paints, and printing inks.

Examples of metallic effect pigments coated with silicon oxides are the products sold under the brand names PCR, Hydrolan® (from ECKART, aluminum pigments), RESIST™, and DOROLAN® (gold bronze pigments, from Eckart). A chromating procedure produces protective layers of chromium-aluminum mixed oxides (EP 0 259 592 B1); corresponding products are sold under the brand name STAPA Hydrolux®. Under the brand name STAPA Aloxal®, aluminum pigments with layers of aluminum oxide or aluminum oxide hydrate (EP 0 848 735 B1) are on the market. Here, the oxide layer has coloring properties as well as the protective function. All of these pigments are sold by ECKART GmbH, Furth.

Aluminum effect pigments with a metal oxide layer with vanadates are described in EP 0 616 946, for example, and with molybdates are described in, for example, EP 0 583 919 B1, EP 0 962 505 or EP 1 619 222 A1, the content of each of which is incorporated by reference.

In accordance with the invention, furthermore, combinations of one or more oxide layers are also possible. Thus, for example, EP 1 619 222 A1 describes a combination of molybdate and $SiO_2$ protective layers, and EP 1 685 198 A2 describes pigments with an aluminum oxide layer, a high-index metal chalcogenide layer, and a hybrid layer of these layers inbetween. The aforementioned metallic effect pigments may likewise be used in the pigment preparation of the invention.

Commercially available passivated metallic effect pigments are used in the waterborne paints segment (industrial coatings, automobile finishes). Customary in particular are aluminum effect pigments coated with layers of $SiO_2$, chromation coats, aluminum oxide layers or molybdenum oxide layers. Aluminum effect pigments of this kind are presently not in commercial use in aqueous printing inks, because they either are too large and/or they do not exhibit sufficient transfer behavior on printing. The layer thicknesses of these passivation coats are preferably in the range from 5 to 90 nm, preferably from 6 to 35 nm. In the case of $SiO_2$ layers, the layer thicknesses are preferably 6 to 40 nm and more preferably 8 to 35 nm.

These passivated aluminum effect pigments are marketed in the form of pastes. The pigment fraction here is typically 65% by weight. They are available in a very wide range of solvents. Isopropanol is used very frequently, examples being the products Stapa IL Hydrolan or Stapa Aloxal 3010 from Eckart. This solvent, however, is not always ideally compatible with waterborne coatings. Moreover, as a result of the preparation procedure, there is still up to about 6% by weight of aliphatics or aromatics such as white spirit or solvent naphtha present in the aforementioned pastes. This relatively high fraction of highly apolar and/or hydrophobic solvents reduces the compatibility of the pigments with the waterborne coating material. The consequents are agglomerates of aluminum effect pigment, which detract from the opacity.

The aluminum effect pigments can, indeed, be freed from these solvents by what is called a rewetting operation, and then pasted up in some other solvent. In this operation, the solvent is first stripped from the pigments under reduced pressure and at elevated temperatures, to give a metal powder. With the aid, for example, of a mixing coil, the pigments are agitated strongly during this procedure. As the stripping of solvent progresses, however, there is a sharp rise in the viscosity of the metal paste. This leads to high shearing energies, as a result of which the passivating coats or corrosion protection coats may be damaged. The pigments may suffer a reduction in or even a loss of their gassing stability properties, and therefore may be used in the waterborne coating material not at all or only with considerable reductions in quality.

Moreover, all solvent-based pastes have a certain VOC content, a factor which is increasingly undesirable for use in waterborne coating material, on environmental grounds.

With the pigment preparations of the invention it is possible, surprisingly, for these problems to be solved.

The pigment preparations of the invention comprise 60%-95% by weight of metallic effect pigments, preferably 65% to 92% by weight, more preferably 70%-90% by weight, and very preferably 80%-90% by weight, based in each case on the total weight of the pigment preparation. Below a level of 60% by weight, the concentration is too low for the user. Above 95% by weight, the concentration of the metallic effect pigments is too high to ensure firm cohesion of the pigment preparation in compacted form.

As the binder present in the pigment preparation of the invention, use is made of binders which are free from styrene groups and have an acid number of 150-500 mg KOH/g binder and preferably a hydroxyl group content of 0-35 mg KOH/g binder. Corresponding binders or resins are described in references including Karsten, Lackrohstofftabellen, $10^{th}$ edition, 2000.

Binders having an acid number below 150 mg KOH/g resin have proven poorly suited in particular to aqueous applications. The acid number is preferably 180-500 mg KOH/g binder and more preferably over 200-400 mg KOH/g binder.

The acid number is determined in accordance with DIN EN ISO 2114 (formerly DIN 53402).

The binder is preferably a resin.

Furthermore, the binders or resins in the pigment preparation of the invention have a melting point or a melting band from a range from 120° C.-200° C., preferably from 130° C.-190° C., and more preferably from 140° C.-180° C. The high melting point or melting-point range is particularly important in order to prevent blocking of the metallic effect pigment products in the course, for example, of the drying operation or later in the supply container.

In the supply container, the pigment preparations may under certain circumstances be exposed for several weeks to months to elevated temperatures (and pressures) before being put to their intended application, in varnishes, paints or printing inks, for example.

The melting point or melting band is determined in accordance with DIN 53181 (capillary method).

In the case of solvent-based applications, the resin ought preferably not to be used in a neutralized form.

For the segment of water-based applications, however, it is necessary to carry out full or partial neutralization of the resin, using suitable neutralizing agents, or mixtures thereof, that are customary in aqueous varnishes and paints, in order to bring about solubility in water. Neutralizing agents contemplated include alkali metal hydroxides, such as, for example, NaOH or KOH, ammonia, urea and its derivatives, and amines and alkanolamines.

Preference is given to using neutralizing agents which under the drying conditions of the pigment preparation, but at least up to 100° C., are nonvolatile or of low volatility.

The metal pigment preparation of the invention, more particularly aqueous metal pigment preparations of the invention, may therefore comprise neutralizing agent(s) in a fraction of 0.5%-11% by weight, preferably 1%-9% by weight, and more preferably 2%-8% by weight, based in each case on the total weight of the pigment preparation.

In one preferred embodiment the binders, preferably resins, in the pigment preparations of the invention have a hydroxyl group content of 0-35 mg KOH/g binder, preferably of 3-35 mg KOH/g binder, and more preferably of 5-30 mg KOH/g binder.

The hydroxyl number here is determined in accordance with EN ISO 4629.

Above a hydroxyl group content of 35 mg KOH/g binder, the binders, preferably resins, have too low a dispersibility, and this leads to a sharply reduced opacity on the part of the metallic effect pigment preparation of the invention, especially in water-based application systems.

The concentration of the styrene-group-free binder, preferably resin, in the pigment preparation of the invention is 0.5%-40% by weight, preferably at 1%-30% by weight, and very preferably at 5%-20% by weight, based in each case on the total weight of the pigment preparation.

Below 0.5% by weight, the styrene-group-free binder, preferably resin, lacks sufficient activity, and hence, in particular, the compacted pigment preparation lacks distortion resistance.

Above a fraction of 40% by weight, there may be instances of incompatibility with the application system. Here, furthermore, the fraction of the metallic effect pigment in the pigment preparation is too low, since one of the features of the metallic effect pigment preparation of the invention is the high metallic effect pigment content.

As binder free from styrene groups, it is of course also possible to use mixtures of different styrene-group-free binders.

It has surprisingly been found that resins from the group of the modified and/or functionalized maleate resins are particularly suitable as styrene-group-free binders.

Maleate resins are synthesized from maleic anhydride and rosin, and are subsequently esterified and modified or functionalized, in order to obtain optimum, broad compatibility with the binder components that are typically used in varnishes, paints, and printing inks. Where these resins possess a sufficiently high acid number, as specified in claim 1, they can be made water-soluble through neutralization. Suitable neutralizing agents are the customary coatings-industry amines, organic amines, alkanolamines, ammonia, and alkali metal hydroxide solutions, and also urea and its derivatives. The modified maleate resins are, in accordance with the invention, maleate resins free from styrene groups.

Particularly good results in terms of wetting behavior and compatibility have been achieved with maleate resins modified by carboxyl groups. Surprisingly it has been found that carboxyl-group-modified resins in particular can be used to produce dry products from the pigment preparation of the invention that can be employed directly, without dispersion beforehand, in a completed varnish batch or paint batch.

Binders for the production of the present invention are known on the market and are available from, for example, Kraemer under the brand name Erkamar®, e.g., Erkamar® 3260, Erkamar® 3265, Erkamar® 3270, Erkamar® 3280, Erkamar® 3285, Erkamar® 3300, Erkamar® 3360, and Erkamar® VP 4760, from Hexion under the brand names Prince™ and Setaprint™, e.g., Prince™ 1614, Prince™ 1626, Prince™ 6200, Prince™ 6500, Prince™ 8200, and Setaprint™ M-1400, and from Worlée-Chemie GmbH under the name WorléeSin, e.g., WorléeSin MS 235, WorléeSin MS 265, and WorléeSin MS 270.

Depending on the area of application, the performance properties of the pigment preparation of the invention can be further improved through the incorporation into the product of at least one additive. Additives, in accordance with DIN 55945 A1, are substances added in small amounts to a coating material in order to give it, or a coating produced from it, specific properties. In practice it has proven useful to add additives to the metallic effect pigments themselves.

The at least one additive is selected preferably from the group consisting of wetting agents, dispersants, surface additives, rheological additives, defoamers, antisettling agents, corrosion inhibitors, and mixtures thereof. The additive or additives may influence pigment wetting, dispersibility, the extent of the optical effect, and/or the rheology of the paint or varnish. Furthermore, additives may also have a corrosion stabilization effect in the context in particular of metallic effect pigments.

In the pigment preparation of the invention, the at least one additive may be present in an amount of 0%-25% by weight, preferably 0%-15% by weight, and more preferably 0%-10% by weight, the figure in % by weight being based on the total weight of the pigment preparation. The pigment preparation of the invention preferably comprises at least one additive with corrosion stabilization effect in relation to the effect pigment, and/or with surface activity properties that influence the wetting and dispersing and/or the rheology of the pigment preparation. The additives in question are those of the kind typically used in paints and varnishes (Karsten, Lackrohstofftabellen, 10th edition, 2000). Examples of further additives which can be used with the pigment preparation of the invention include the following:

- Antisettling agents are available, for example, from Tego Chemie Service GmbH under the designation Tego Dispers or from Vianova Resins GmbH & Co. KG under the designation Additol.
- Corrosion inhibitors are available, for example, from Ciba Spezialitätenchemie Lampertheim GmbH under the designation Irgacor or from Chemische Fabrik Budenheim under the designation Budit.
- Defoamers and deaerators are available, for example, from Byk-Chemie under the designation Byk or from Efka Additives BV under the designation Efka
- Antifloating agents are available, for example, from Byk-Chemie under the designations Anti-Terra, Byk, Disperbyk, and Lactimon, or from Cognis Deutschland GmbH under the designation Hydropalat, or from Efka Additives BV under the designation Efka, or from Vianova Resins GmbH & Co. KG under the designation Additol.
- Gloss enhancers are available, for example, from Efka Additives BV under the designation Efka or from Vianova Resins GmbH & Co. KG under the designation Additol.
- Matting agents are available, for example, from Lubrizol Coating Additives GmbH under the designation Lanco or from Chem. Fabrik L.P. Bader & Co. GmbH under the designation Luba-Print.
- Wetting and dispersing additives are available, for example, from Byk-Chemie under the designations Anti-Terra, Byk, Disperbyk, and Lactimon, or from Cognis Deutschland GmbH under the designation Hydropalat, Disponil, and Texaphor, or from Efka Additives BV under the designation Efka, or from Vianova Resins GmbH & Co. KG under the designation Additol, or from Tego Chemie Service GmbH under the designation Tego Dispers.
- Rheological additives are available, for example, from Borchers GmbH under the designation Borchigel or from Byk-Chemie under the designation Byk or from Ciba Spezialitätenchemie Lampertheim GmbH under the designation Viscalex and Rheovis
- Flow control additives are available, for example, from Byk-Chemie under the designation Byk or Byketol or from Efka Additives BV under the designation Efka or from Vianova Resins GmbH & Co. KG under the designation Additol.

It has surprisingly emerged that it is advantageous not to incorporate any polyethylene glycol into the pigment preparation of the invention. In this way it is possible to avoid deteriorations in the shelflife of the dry pigment preparation and also problems associated with the weathering stability of coatings comprising the preparation. According to one preferred development of the invention, the pigment preparation of the invention comprises no polyalkylene glycols, and more particularly no polyethylene glycol.

Furthermore, as well as the coated metal pigments, the metallic effect pigment preparations of the invention may also comprise conventional color pigments and/or dyes.

Conventional color pigments used are preferably color pigments having an average particle size from the range from 0.05 to 5 µm, preferably 1 to 3 µm. The color pigments which can be used comprise not only organic but also inorganic pigments.

Inorganic color pigments used may be chromatic pigments, black pigments, and white pigments. Typical organic pigments are chromatic pigments and black pigments.

Suitable organic pigments are, for example:

| | |
|---|---|
| Monoazo pigments: | C.I. Pigment Brown 25; C.I. Pigment Orange 5, 13, 36, 38, 64, and 67; C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247, and 251; C.I. Pigment Yellow 1, 3, 62, 65, 73, 74, 97, 120, 151, 154, 168, 181, 183, and 191; C.I. Pigment Violet 32; |
| Disazo pigments: | C.I. Pigment Orange 16, 34, 44, and 72 C.I. Pigment Yellow 12, 13, 14, 16, 17, 81, 83, 106, 113, 126, 127, 155, 174, 176, 180, and 188; |
| Disazo condensation pigments: | C.I. Pigment Yellow 93, 95, and 128; C.I. Pigment Red 144, 166, 214, 220, 221, 242, and 262; C.I. Pigment Brown 23 and 41; |
| Anthranthrone pigments: | C.I. Pigment Red 168; |
| Anthraquinone pigments: | C.I. Pigment Yellow 147, 177, and 199; C.I. Pigment Violet 31; |
| Anthrapyrimidine pigments: | C.I. Pigment Yellow 108; |
| Quinacridone pigments: | C.I. Pigment Orange 48 and 49; C.I. Pigment Red 122, 202, 206, and 209; C.I. Pigment Violet 19; |
| Quinophthalone pigments: | C.I. Pigment Yellow 138; |
| Diketopyrrolopyrrole pigments: | C.I. Pigment Orange 71, 73, and 81; C.I. Pigment Red 254, 255, 264, 270, and 272; |
| Dioxazine pigments: | C.I. Pigment Violet 23 and 37; C Pigment Blue 80; |
| Flavanthrone pigments: | C.I. Pigment Yellow 24; |
| Indanthrone pigments: | C.I. Pigment Blue 60 and 64; |
| Isoindoline pigments: | C.I. Pigment Orange 61 and 69; C.I. Pigment Red 260; C.I. Pigment Yellow 139 and 185; |
| Isoindolinone pigments: | C.I. Pigment Yellow 109, 110, and 173; |
| Isoviolanthrone pigments: | C.I. Pigment Violet 31; |
| Metal complex pigments: | C.I. Pigment Red 257; C.I. Pigment Yellow 117, 129, 150, 153, and 177; C.I. Pigment Green 8; |
| Perinone pigments: | C.I. Pigment Orange 43; C.I. Pigment Red 194; |
| Perylene pigments: | C.I. Pigment Black 31 and 32; C.I. Pigment Red 123, 149, 178, 179, 190, and 224; C.I. Pigment Violet 29; |
| Phthalocyanine pigments: | C.I. Pigment Blue 15, 15:1, 15:2, 15:3, 15:4, 15:6, and 16; C.I. Pigment Green 7 and 36; |
| Pyranthrone pigments: | C.I. Pigment Orange 51; C.I. Pigment Red 216; |
| Pyrazoloquinazolone | C.I. Pigment Orange 67; |

| | |
|---|---|
| pigments: | C.I. Pigment Red 251; |
| Thioindigo pigments: | C.I. Pigment Red 88 and 181; |
| | C.I. Pigment Violet 38; |
| Triarylcarbonium pigments: | C.I. Pigment Blue 1, 61, and 62; C. |
| | C.I. Pigment Green 1; |
| | C.I. Pigment Red 81, 81:1, and 169; |
| | C.I. Pigment Violet 1, 2, 3, and 27; |
| C.I. Pigment Black 1 (aniline black); | |
| C.I. Pigment Yellow 101 (aldazine yellow); | |
| C.I. Pigment Brown 22. | |

Examples of suitable inorganic pigments are:

| | |
|---|---|
| White pigments: | Titanium dioxide (C.I. Pigment White 6), zinc white, pigmentary zinc oxide; zinc sulfide, lithopones; |
| Black pigments: | Black iron oxide (C.I. Pigment Black 11), iron-manganese black, spinel black (C.I. Pigment Black 27); carbon black (C.I. Pigment Black 7); |
| Chromatic pigments: | Chromium oxide, chromium oxide hydrate green; chromium green (C.I. Pigment Green 48); cobalt green (C.I. Pigment Green 50); ultramarine green; cobalt blue (C.I. Pigment Blue 28 and 36; C.I. Pigment Blue 72); ultramarine blue; manganese blue; ultramarine violet; cobalt and manganese violet; red iron oxide (C.I. Pigment Red 101); cadmium sulfoselenide (C.I. Pigment Red 108); cerium sulfide (C.I. Pigment Red 265); molybdate red (C.I. Pigment Red 104); ultramarine red; brown iron oxide (C.I. Pigment Brown 6 and 7), mixed brown, spinel phases and corundum phases (C.I. Pigment Brown 29, 31, 33, 34, 35, 37, 39, and 40), chromium titanium yellow (C.I. Pigment Brown 24), chromium orange; cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164, and 189); chromium titanium yellow; spinel phases (C.I. Pigment Yellow 119); cadmium sulfide and cadmium zinc sulfide (C.I. Pigment Yellow 37 and 35); chromium yellow (C.I. Pigment Yellow 34); bismuth vanadate (C.I. Pigment Yellow 184). |

In addition to the coated metallic effect pigments, furthermore, the pigment preparations of the invention may also include other effect pigments such as, for example, pearlescent pigments. Through the use of at least two different effect pigment types it is possible to achieve particular application outcomes in terms of color, gloss, and lightness effects.

Preferably, however, the pigment preparations of the invention comprise the metallic effect pigments in pure form.

The metal pigment preparation of the invention is provided preferably in the form of granules, pellets, briquettes, chips or tablets.

In the respective presentation form, the residual moisture content has a value of 0% to 15% by weight, preferably of 0.05% to 10% by weight, more preferably of 1% to 5% by weight, in terms of water and/or organic solvent or solvent mixture, based in each case on the total weight of the metallic effect pigment preparation. In the case in particular of granules which have no compact, regular shape, the residual moisture content may lie in the higher range, as for example at 5% to 15% by weight and preferably at 6% to 10% by weight, based in each case on the total weight of the granules.

In the case of the regularly shaped presentation forms represented by pellets, briquettes, chips or tablets, lower residual moisture contents of 0% to 10% by weight are preferred, more preferably of 0.05% to 3% by weight, and with particular preference of 0.1% to 1% by weight, based in each case on the total weight of the pigment preparation.

In the case of aqueous applications in particular it is preferred for the amount of organic solvents in the pigment preparation of the invention to be below 2% by weight, preferably below 1% by weight, and more preferably below 0.5% by weight, in order to minimize the VOC and/or odor loading.

A method for producing the pigment preparation of the invention comprises the following steps:

a) mixing and preferably homogenizing a metallic effect pigment which has at least one low-refractive-index layer (low-index layer) on the metallic core of the metallic effect pigment, the low-index layer comprising or consisting of at least one inorganic component, with at least one binder which is free from styrene groups, has an acid number of 150-500 mg KOH/g binder, and a melting point or melting range which lies in the range of 120-200° C., b) compacting the mixture a) obtained in step a)

c) optionally drying.

The compacting here comprises preferably tableting, briquetting, pelletizing, rolling, fluidized-bed granulating, granulating, spray-granulating, extruding or combinations thereof.

The metallic effect pigment and also any further pigments, such as pearlescent pigments or color pigments, for example, is/are introduced either in powder form or in the form of a paste. Where a paste is used, it preferably comprises the same solvent as the binder solution to be admixed subsequently, preferably resin solution. The use of identical solvents makes it easier for the solvent to be used again after the drying of the pigment preparation, without costly and inconvenient separation necessary if different solvents are used.

Suitable solvents, not only for the pigment preparation and/or effect pigment paste but also for the binder solution, preferably resin solution, are the solvents that are customary in pigment processing, such as aromatics, aliphatics, esters, glycols and/or alcohols. Particularly preferred in this context are solvents having a boiling point of below 100° C., preferably below 90° C.

With further preference, water-compatible solvents are used, so that remnants of any apolar and/or hydrophobic solvent present in the preparation do not result in compatibility problems in the case of use in waterborne coating materials. The amount of apolar and/or hydrophobic solvent is preferably less than 1% by weight, more preferably less than 0.1% by weight, based in each case on the total weight of the pigment preparation.

As water-compatible solvent it is preferred to use esters, glycols and/or alcohols.

The binder solution, preferably resin solution, is prepared by introducing the solvent and then adding the binder, preferably resin. Following complete dissolution of the binder, preferably resin, it is possible as and when required to add neutralizing agent.

The drying, taking place preferably after shaping, of the compacted pigment preparation, which is still moist, takes place preferably at temperatures between 30° C. and 120° C., but preferably at temperatures between 60° and 100° C. For acceleration, the drying operation may be carried out under reduced pressure. Drying takes place preferably without moving or mixing the compacted pigment preparation.

Drying produces low-dust, preferably dust-free, compacted pigment preparations which are dimensionally stable and virtually odorless, preferably in the form of granules, pellets, beads, chips, briquettes, tablets, sausages, etc., which have preferably particle sizes from a range from 0.1 mm to 15 mm, preferably from 0.2 mm to 10 mm.

The dry, compacted pigment preparation of the invention is notable for good free-flowability and meterability. The pigment preparation of the invention may be employed not only in water-based but also in solvent-based paints, varnishes, such as, for example, automobile finishes and industrial coatings, other coatings, printing inks, and cosmetic formulations. A further possibility is the coloring of plastics using the metal pigment preparation. Where it is employed in water-based systems, the product of the invention may be suspended in water or customary cosolvents, such as butylglycol, for example. To simplify processing, direct incorporation into the water-based application medium is also possible, and this represents a great advantage relative to pastes and powders. In both cases, the product of the invention exhibits outstanding dispersing properties and can be processed without residue.

In the case of application in solvent-based systems, as well, the product of the invention can either be predispersed in a suitable solvent and then incorporated into the varnish or paint, or else incorporated directly by dispersion into the varnish or paint. Owing to the outstanding dispersing behavior of the pigment preparation of the invention, significantly higher opacities are achieved in coatings applications by comparison with corresponding pigment pastes or pigment powders.

Since metallic effect pigments are reactive, prolonged storage may be accompanied by alterations. These alterations are manifested primarily in the formation of pigment aggregates, in other words intergrown associations of primary particles lodged flatly against one another. The term "aggregate" is defined in the "Lehrbuch der Lacktechnologie", $2^{nd}$ edition, 2000, Vincentz Verlag, Hannover. Aggregation results in a change in the particle size distribution, and this leads to a reduction in the opacity of the pigment. The pigment preparation of the invention is notable for a low level of alterations during the storage period.

The pigment preparations of the invention find use in water-based or solvent-based varnishes, paints, coatings, printing inks, cosmetic formulations, or in plastics.

The pigment preparations of the invention find use more preferably in varnishes, paints, coatings, printing inks or cosmetic formulations which are constructed on an aqueous basis.

The object on which the present invention is based is therefore also achieved through provision of varnishes, paints, printing inks, plastics or cosmetic formulations which comprise a pigment preparation of the invention.

The object on which the present invention is based is also achieved through provision of varnishes, paints, printing inks or cosmetic formulations which comprise a pigment preparation of the invention and are constructed on an aqueous basis. Particularly preferred are waterborne coating materials which comprise the pigment preparation of the invention.

The object on which the invention is based is likewise achieved through provision of an article which has the pigment preparation of the invention or a varnish, a paint or printing ink which comprises the pigment preparation of the invention.

The article may be, for example, an automobile body, an electrical apparatus, an architectural facing element or a print stock such as, for example, a film, or a paper or card.

EXAMPLES

The following examples are provided only for the purpose of illustrating the invention and they should not be considered as limiting in any way.

Working Examples

Inventive Example 1

12.1 g of Erkamar 3300 (maleate resin from Robert Kraemer, acid number: 300 mg KOH/g resin, melting point 140±10° C.; hydroxyl number: 0 mg KOH/g resin) were dissolved in 21.8 g of isopropyl alcohol, after which 9.7 g of triethanolamine were added and the solution was homogenized by means of a dispersing apparatus (Silverson L4RT). This solution was introduced into the aluminum effect pigment paste STAPA® Hydrolux 600 (effect pigment from ECKART) and homogenized by means of a mixing device. The amount of paste used contained 123.4 g of aluminum effect pigment. The homogenized preparation was processed by means of a press with ram and perforated plate to form granules/sausages with a length of approximately 2-10 mm and a diameter of approximately 2-3 mm. Drying took place over the course of 24 hours at 75° C. under reduced pressure (100 mbar) in a vacuum drying cabinet.

Inventive Example 2

12.1 g of Erkamar 3300 were dissolved in 21.8 g of isopropyl alcohol, after which 9.7 g of triethanolamine were added and the solution was homogenized by means of a dispersing apparatus (Silverson L4RT). This solution was introduced into the aluminum effect pigment paste STAPA® Hydrolan 701 (effect pigment from ECKART) and homogenized by means of a mixing device. The amount of paste used contained 123.4 g of aluminum effect pigment. The homogenized preparation was processed by means of a press with ram and perforated plate to form granules/sausages with a length of approximately 2-10 mm and a diameter of approximately 2-3 mm. Drying took place over the course of 24 hours at 75° C. under reduced pressure (100 mbar) in a vacuum drying cabinet.

Inventive Example 3

14.2 g of Erkamar 3270 (maleate resin from Robert Kraemer, acid number: 200 mg KOH/g resin, melting point 160±10° C.; hydroxyl number: 30 mg KOH/g resin) were dissolved in 21.8 g of isopropyl alcohol, after which 7.6 g of triethanolamine were added and the solution was homogenized by means of a dispersing apparatus (Silverson L4RT). This solution was introduced into the aluminum effect pigment paste STAPA® Hydrolan 701 (effect pigment from ECKART) and homogenized by means of a mixing device.

The amount of paste used contained 123.4 g of aluminum effect pigment. The homogenized preparation was processed by means of a press with ram and perforated plate to form granules/sausages with a length of approximately 2-10 mm and a diameter of approximately 2-3 mm. Drying took place for 24 hours at 75° C. under reduced pressure (100 mbar) in a vacuum drying cabinet.

Inventive Example 4

12.1 g of Erkamar 3300 (maleate resin from Robert Kraemer) were dissolved in 21.8 g of isopropyl alcohol, after which 9.7 g of triethanolamine were added and the solution was homogenized by means of a dispersing apparatus (Silverson L4RT). This solution was introduced into the aluminum effect pigment paste STAPA Aloxal® 3010 (effect pigment from ECKART) and homogenized by means of a mixing device. The amount of paste used contained 123.4 g of aluminum effect pigment. The homogenized preparation was processed by means of a press with ram and perforated plate to form granules/sausages with a length of approximately 2-10 mm and a diameter of approximately 2-3 mm. Drying took place over the course of 24 hours at 75° C. under reduced pressure (100 mbar) in a vacuum drying cabinet.

Inventive Example 5

14.2 g of WorléeSin MS 265 (maleate resin from Worlée-Chemie GmbH, acid number: 190-220 mg KOH/g resin, softening point 160-180° C. (DIN 53181)) were dissolved in 21.8 g of isopropyl alcohol, after which 7.6 g of triethanolamine were added and the solution was homogenized by means of a dispersing apparatus (Silverson L4RT). This solution was introduced into the aluminum effect pigment paste STAPA® Hydrolan 701 (effect pigment from ECKART) and homogenized by means of a mixing device. The amount of paste used contained 123.4 g of aluminum effect pigment. The homogenized preparation was processed by means of a press with ram and perforated plate to form granules/sausages with a length of approximately 2-10 mm and a diameter of approximately 2-3 mm. Drying took place for 24 hours at 75° C. under reduced pressure (100 mbar) in a vacuum drying cabinet.

Comparative Example 6

6.7 g of SMA®-1440 F (styrene-modified maleate resin from Cray Valley, acid number: 165-205 mg KOH/g resin, glass transition temperature: 60° C.) were dissolved in 47.9 g of DI water and 1.8 g of 25% strength ammonia solution. Following dissolution of the resin, 1.6 g of polyethylene glycol 2000 were metered in and the mixture was homogenized by means of a dispersing apparatus (Silverson L4RT) until a clear solution was produced. This solution was introduced into the aluminum effect pigment paste STAPA® Hydrolan 701 (effect pigment from ECKART) and homogenized by means of a mixing device. The amount of paste used contained 100 g of aluminum effect pigment. Following homogeneous mixing, the preparation thus produced was processed by means of a press with ram and perforated plate to form granules/sausages with a length of approximately 2-10 mm and a diameter of approximately 2-3 mm. Drying took place for 24 hours at 80° C. under reduced pressure (100 mbar) in a vacuum drying cabinet.

Comparative Example 7

Corresponding to Example 1 of EP 1 153 995

13.5 g of Erkamar VP 2975 (maleate resin from Robert Kraemer, acid number: 170 mg KOH/g resin, hydroxyl number: 78 mg KOH/g resin, melting point 90° C.) were introduced into 40.9 g of DI water which had been heated to 50° C. and was stirred by means of a paddle stirrer. Then 3.0 g of 25% strength by weight ammonia solution were added slowly. Stirring was continued until the resin was fully dissolved. Finally, 40.9 g of water and 3.0 g of polyethylene glycol 2000 were added. The mixture as a whole was stirred for 5 minutes more. This solution was then introduced into the aluminum effect pigment paste STAPA® Hydrolan 701 (effect pigment from ECKART). The amount of paste used contained 148.8 g of aluminum effect pigment. Following homogeneous mixing in a mixing apparatus, the preparation thus produced was processed by means of a press with ram and perforated plate to form granules/sausages with a length of approximately 2-10 mm and a diameter of approximately 2-3 mm. Drying took place over the course of 24 hours at 80° C. under reduced pressure (100 mbar) in a vacuum drying cabinet.

Comparative Example 8

Corresponding to Example 2 of EP 1 153 995

13.5 g of Erkamar VP 2975 were introduced into 40.9 g of DI water which had been heated to 50° C. and was stirred by means of a paddle stirrer. Then 3.0 g of 25% strength by weight ammonia solution were added slowly. Stirring was carried out until the resin was fully dissolved. Finally, 40.9 g of water and 3.0 g of Hydropalat 875 (Na salt of sulfosuccinic acid, from Henkel) were added. The mixture as a whole was stirred for 5 minutes more.

This solution was then introduced into the aluminum effect pigment paste STAPA® Hydrolan 701 (effect pigment from ECKART). The amount of paste used contained 148.8 g of aluminum effect pigment. Following homogeneous mixing in a mixing apparatus, the preparation thus produced was processed by means of a press with ram and perforated plate to form granules/sausages with a length of approximately 2-10 mm and a diameter of approximately 2-3 mm. Drying took place over the course of 24 hours at 80° C. under reduced pressure (100 mbar) in a vacuum drying cabinet.

Comparative Example 9

12.5 g of Erkamar VP 2975 were introduced into 40.9 g of DI water which had been heated to 50° C. and was stirred by means of a paddle stirrer. Then 3.0 g of 25% strength by weight ammonia solution were added slowly. Stirring was carried out until the resin was fully dissolved. The mixture as a whole was stirred for 5 minutes more.

This solution was introduced into the aluminum effect pigment paste STAPA® Hydrolan 701 (effect pigment from ECKART). The amount of paste used contained 123.4 g of aluminum effect pigment. Following homogeneous mixing in a mixing apparatus, the preparation thus produced was processed by means of a press with ram and perforated plate to form granules/sausages with a length of approximately 2-10 mm and a diameter of approximately 2-3 mm. Drying took place over the course of 24 hours at 75° C. under reduced pressure (100 mbar) in a vacuum drying cabinet.

The aluminum effect pigment content and resin content of the above examples are summarized in table 1.

TABLE 1

| Sample | Metal pigment content [% by weight based on total weight of preparation] | Resin content [% by weight based on total weight of preparation] |
| --- | --- | --- |
| Example 1 | 85.0 | 15.0 |
| Example 2 | 85.0 | 15.0 |
| Example 3 | 85.0 | 15.0 |
| Example 4 | 85.0 | 15.0 |
| Example 5 | 85.0 | 15.0 |
| Comparative example 6 | 91.9 | 6.6 |
| Comparative example 7 | 89.6 | 8.6 |
| Comparative example 8 | 89.6 | 8.6 |
| Comparative example 9 | 90.3 | 9.7 |

Test Results for the Pigment Preparation of the Inventive Examples and of the Comparative Examples:

The pigment preparations of the inventive examples and comparative examples were subjected to a test for the strength and dust-free state of the dried pigment preparation, and to an assessment of dispersibility in a waterborne coating material, opacity, and shelflife.

A Strength and Dust-Free State:

To test the strength and dust-free state of the dry granules, 5.0 grams of the product in question were placed in a standing cylinder with a clear diameter of 4 cm and a height of 25 cm. A cylinder-shaped weight (diameter 3 cm, height 4.5 cm) with a mass of 100 grams was dropped from a height of 25 cm onto the bed of product in the standing cylinder. The product bed was subsequently emptied out and evaluated by inspection. In accordance with DIN 53230, the basis for the assessment was the following evaluation scheme:

| Rating 0 | Outstanding strength, no dusting |
| --- | --- |
| Rating 1 | Outstanding strength, very slight dusting |
| Rating 2 | Good strength, minor dusting |
| Rating 3 | Moderate strength, marked dusting |
| Rating 4 | Dusting prior to testing; after testing, disintegrated granules, predominant dust fraction |
| Rating 5 | Granules disintegrated even prior to testing |

Results of the Examples:

TABLE 2

Strength and dust-free state

| Sample | Rating |
| --- | --- |
| Example 1 | 1 |
| Example 2 | 2 |
| Example 3 | 1 |
| Example 4 | 2 |
| Example 5 | 2 |
| Comparative example 6 | 3 |
| Comparative example 7 | 4 |
| Comparative example 8 | 4 |
| Comparative example 9 | 3 |

Accordingly, the strength and dust-free state of the pigment preparation of the inventive examples are significantly higher. The strength is also a measure of the shape-stability. The pigment preparations of the comparative examples from the prior art are not sufficiently solid and shape-stable.

B Dispersibility and Opacity in a Waterborne Coating Material:

The dry pigment preparation was compared with the respective starting material, in other words the respective aluminum effect pigment paste or the respective aluminum effect pigment powder, for dispersibility of the aluminum effect pigments and opacity of the resultant composition. For these purposes, the respective material, with a consistent level of pigmentation in terms of the amount of aluminum effect pigment, was incorporated into an aqueous test varnish and drawn down by rod application (spiral-wound rod, 50 μm) onto a black/white opacity chart from Byk-Chemie GmbH, Germany. The test varnish used was Hydrostammlack L 8900623 (from Votteler, Germany). The opacity was assessed visually on the opacity chart.

TABLE 3

Dispersibility and opacity in the test varnish

| Sample | Visual assessment of dispersibility | Visual assessment of opacity in comparison to the starting material |
| --- | --- | --- |
| Example 1 | In comparison to the starting material, the dry pigment preparation was much easier to disperse in the test varnish. | Extraordinarily higher opacity. The black/white pattern on the opacity chart was significantly less visible |
| Example 2 | In comparison to the starting material, the dry pigment preparation was much easier to disperse in the test varnish. | Higher opacity. The black/white pattern on the opacity chart was less visible |
| Example 3 | In comparison to the starting material, the dry pigment preparation was much easier to disperse in the test varnish. | Higher opacity. The black/white pattern on the opacity chart was significantly less visible |
| Example 4 | In comparison to the starting material, the dry pigment preparation was much easier to disperse in the test varnish. | Lower opacity. The black/white pattern on the opacity chart was significantly visible |
| Example 5 | In comparison to the starting material, the dry pigment preparation was much easier to disperse in the test varnish. | Higher opacity. The black/white pattern on the opacity chart was less visible |
| Comparative example 6 | In comparison to the starting material, the dry pigment preparation was difficult to disperse. Ease of incorporation into the varnish was much poorer than for the starting material | Significantly lower opacity. The black/white pattern on the opacity chart showed through much more strongly. |
| Comparative example 7 | The dispersibility of the dry pigment preparation is similar to that of the starting material | Approximately the same opacity |
| Comparative example 8 | The dispersibility of the dry pigment | Approximately the same opacity |

TABLE 3-continued

Dispersibility and opacity in the test varnish

| Sample | Visual assessment of dispersibility | Visual assessment of opacity in comparison to the starting material |
|---|---|---|
| Comparative example 9 | preparation is similar to that of the starting material The dispersibility of the dry pigment preparation is similar to that of the starting material | Approximately the same opacity |

As is evident from the results in table 3, the pigment preparations of the invention exhibited better opacity in the waterborne varnish than the effect pigment pastes that are typically used. This is a very surprising effect, since normally the opacity observed for a metal effect pigment preparation in comparison to the typical paste form is at best the same.

The probable reason for this result was the fact that the solvents in the effect pigment pastes (starting material), which as a result of the preparation process still contain up to 6% by weight of water-incompatible (apolar and/or hydrophobic) solvents such as white spirit and/or aromatics such as solvent naphtha, are the cause of a lower compatibility of the effect pigments with the waterborne varnish. As a result, the dispersibility of the aluminum effect pigments in the waterborne varnish is adversely affected as well, since the pigments are apparently wetted to particularly good effect by these apolar and/or hydrophobic solvents.

In the effect pigment preparation of the invention, these apolar and/or hydrophobic solvents were largely no longer present (solvent content<1% by weight).

The pigment preparation of comparative example 6 had a significantly lower opacity than the starting pigment paste. This low opacity was probably due to the addition of polyethylene glycol and to the use of a binder containing styrene groups.

The opacity of the pigment preparations in the other comparative examples was only similar to that of the effect pigment paste (starting material), despite the fact, of course, that they possessed the advantage of the substantial absence of apolar and/or hydrophobic solvent in the pigment paste. This was probably attributable to the resin. It is thought that this resin had too low an acid number and in particular too low a softening temperature. In the case of an acid number which is too low, compatibility with the waterborne varnish is not ideal. In the case of too low a melting point or melting range, there may be partial blocking and hence formation of effect pigment agglomerates even during the production of the granules. These agglomerates, of course, reduce the opacity, even if the agglomerates are so small that the optical properties are not substantially adversely affected.

C Shelflife:

To simulate a storage period of several months, the dry pigment preparation in each case was stored at 50° C. for four weeks and then compared by rod application with the unexposed (not stored at 50° C.) dry product.

For this purpose, each of the pigment preparations was incorporated into an aqueous test varnish and drawn down by rod application (spiral-wound rod, 50 μm) onto an opacity chart. The test varnish used was, again, Hydrostammlack L 8900623 (from Votteler).

The opacity and aggregation were assessed visually.

TABLE 4

Assessment of shelflife of the sample stored at 50° C.:

| Sample | Visual assessment on basis of rod drawdown |
|---|---|
| Example 1 | Slight reduction in opacity, no aggregation observable. |
| Example 2 | Full retention of opacity, no aggregation observable. |
| Example 3 | Full retention of opacity, no aggregation observable. |
| Example 4 | Visible improvement in opacity, no aggregation observable. |
| Example 5 | Full retention of opacity, no aggregation observable. |
| Comparative example 6 | Complete loss of opacity; the black/white pattern on the opacity chart showed through almost completely. The varnish film was rough and characterized by severe formation of pigment aggregates (seedy). |
| Comparative example 7 | Full retention of opacity, no aggregation observable. |
| Comparative example 8 | Full retention of opacity, no aggregation observable. |
| Comparative example 9 | Full retention of opacity, no aggregation observable. |

The pigment preparation of comparative example 6 showed a complete loss of shelflife. This was probably due to the addition of polyethylene glycol.

Otherwise, on these assessment criteria, there was little to no difference between the pigment preparations of the inventive examples and those of the comparative examples.

What is claimed is:

1. A pigment preparation comprising metallic effect pigments in compacted form, wherein the pigment preparation comprises the following components:
    a) 60%-95% by weight of at least one metallic effect pigment which has at least one low-refractive-index layer (low-index layer) on a metallic core of the metallic effect pigment, the low-index layer comprising at least one inorganic component, wherein the inorganic component is at least one selected from the group consisting of metal oxide, metal hydroxide and metal oxide hydrate,
    b) 0.5%-40% by weight of a binder which is free from styrene groups, has an acid number of 150-500 mg KOH/g binder, and a melting point or melting range which lies in the range of 120-200° C.,
    c) a residual moisture content in the range of 0%-15% by weight of at least one of water, an organic solvent and a solvent mixture, and
    d) optionally, at least one neutralizing agent.

2. The pigment preparation of claim 1, wherein the inorganic component of the low-index layer, or the low-index layer which is at least one of an inorganic metal oxide, metal hydroxide and metal oxide hydrate layer, is selected from the group consisting of oxides, hydroxides and oxide hydrates of elements selected from the group consisting of silicon, aluminum, chromium, chromium-metal alloys, vanadium, molybdenum, mixtures thereof and combinations thereof.

3. The pigment preparation of claim 2, wherein the at least one of the inorganic metal oxide, metal hydroxide and metal oxide hydrate layer is selected from the group consisting of oxides, hydroxides and oxide hydrates of the elements selected from the group consisting of silicon, aluminum, chromium, chromium-metal alloys, molybdenum, and mixtures and combinations thereof and has a layer thickness of 5 to 90 nm.

4. The pigment preparation of claim 1, wherein the binder has an acid number of over 200-500 mg KOH/g resin.

5. The pigment preparation of claim 1, wherein the binder has a hydroxyl group content of 0-25 mg KOH/g binder.

6. The pigment preparation of claim 1, wherein the pigment preparation comprises 0%-25% by weight of at least one additive.

7. The pigment preparation of claim 1, wherein the binder is at least one of a modified and a functionalized binder selected from the group consisting of maleate resins.

8. The pigment preparation of claim 1, wherein the compacted form is selected from the group consisting of granules, pellets, briquettes, chips, tablets, sausages, and mixtures thereof.

9. A method for producing the pigment preparation of claim 1, wherein the method comprises the following steps:
  a) mixing a metallic effect pigment which has at least one low-refractive-index layer (low-index layer) on a metallic core of the metallic effect pigment, the low-index layer comprising at least one inorganic component, with at least one binder which is free from styrene groups, has an acid number of 150-500 mg KOH/g binder, and a melting point or melting range which lies in the range of 120-200° C.,
  b) compacting the mixture obtained in step a), and
  c) optionally drying said mixture.

10. The method for producing a pigment preparation of claim 9, wherein the compacting is carried out by a method selected from the group consisting of tableting, briquetting, pelletizing, rolling, fluidized-bed granulating, granulating, spray-granulating, extruding and combinations thereof.

11. A coating composition comprising the pigment preparation of claim 1.

12. The coating composition of claim 11, wherein the composition is an aqueous-based composition.

13. The coating composition of claim 12, wherein the composition is a waterborne coating material.

14. The pigment preparation of claim 1, wherein the binder has an acid number of 250-400 mg KOH/g resin.

* * * * *

UNITED STATES PATENT AND TRADEMARK OFFICE
CERTIFICATE OF CORRECTION

PATENT NO.        : 8,552,070 B2
APPLICATION NO. : 13/119265
DATED             : October 8, 2013
INVENTOR(S)       : Albrecht et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 176 days.

Signed and Sealed this
Fifteenth Day of September, 2015

Michelle K. Lee
*Director of the United States Patent and Trademark Office*